United States Patent
O'Connor et al.

(10) Patent No.: US 6,313,987 B1
(45) Date of Patent: *Nov. 6, 2001

(54) THERMAL CONNECTOR FOR JOINING MOBILE ELECTRONIC DEVICES TO DOCKING STATIONS

(75) Inventors: Michael O'Connor, Cupertino; Kevin J. Haley, San Jose, both of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/165,006

(22) Filed: Sep. 30, 1998

(51) Int. Cl.[7] .................. G06F 1/20; H05K 7/20
(52) U.S. Cl. .............. 361/687; 361/700; 165/140.14
(58) Field of Search ................ 361/686, 687, 361/700; 165/185, 104.33; 174/15.1, 15.2

(56) References Cited

U.S. PATENT DOCUMENTS

| | | | |
|---|---|---|---|
| 4,449,576 | 5/1984 | Baum et al. | 165/104 |
| 4,730,235 | * 3/1988 | Newton | 361/388 |
| 5,159,972 | 11/1992 | Gunnerson et al. | 165/32 |
| 5,195,576 | 3/1993 | Hatada | 165/80.3 |
| 5,198,889 | 3/1993 | Hisano et al. | 257/678 |
| 5,255,109 | 10/1993 | Klein | 359/43 |
| 5,313,362 | 5/1994 | Hatada et al. | 361/709 |
| 5,361,188 | 11/1994 | Kondou et al. | 361/695 |
| 5,402,312 | 3/1995 | Kinjo et al. | 361/695 |
| 5,409,055 | 4/1995 | Tanaka et al. | 165/104 |
| 5,414,591 | 5/1995 | Kimura et al. | 361/695 |
| 5,424,913 | 6/1995 | Swindler | 361/687 |
| 5,427,502 | 6/1995 | Hudson | 415/211.1 |
| 5,430,609 | 7/1995 | Kikinis | 361/687 |
| 5,441,576 | 8/1995 | Bierschenk et al. | 136/203 |
| 5,458,189 | 10/1995 | Larson et al. | 165/104.33 |
| 5,475,563 | 12/1995 | Donahoe et al. | 361/695 |
| 5,513,070 | 4/1996 | Xie et al. | 361/700 |
| 5,522,712 | 6/1996 | Winn | 417/436 |
| 5,550,710 | 8/1996 | Rahamim et al. | 361/687 |
| 5,559,673 | 9/1996 | Gagnon et al. | 361/695 |
| 5,559,675 | 9/1996 | Hsieh et al. | 361/707 |
| 5,583,316 | 12/1996 | Kitahara et al. | 174/16.3 |
| 5,588,483 | 12/1996 | Ishida | 165/86 |
| 5,598,320 | 1/1997 | Toedtman et al. | 361/687 |
| 5,621,613 | 4/1997 | Hayley et al. | 361/687 |
| 5,646,822 | 7/1997 | Bhatia et al. | 361/687 |
| 5,646,824 | 7/1997 | Ohashi et al. | 361/699 |
| 5,694,292 | 12/1997 | Paulsel et al. | 361/686 |
| 5,704,212 | 1/1998 | Erler et al. | 62/3.2 |
| 5,768,101 | 6/1998 | Cheng | 361/687 |
| 5,788,126 | * 8/1998 | Chang | 222/391 |
| 5,831,823 | 11/1998 | Hoedl | 361/695 |
| 5,832,987 | * 11/1998 | Lowry et al. | 165/86 |
| 5,974,556 | * 10/1999 | Jackson et al. | 713/322 |
| 6,118,654 | * 9/2000 | Bhatia | 361/687 |

FOREIGN PATENT DOCUMENTS 0702287   2/1996   (EP) .................. G06F/1/20

\* cited by examiner

Primary Examiner—Lynn D. Feild
(74) Attorney, Agent, or Firm—Jeffrey S. Draeger (57) ABSTRACT

A heat exchanger adapated for heat dissipation. A first heat transfer element has an end which forms an engaging surface. A second heat transfer element has a receptacle portion which is integrally formed and has an engaging surface that is urged against the engaging surface of the first heat transfer element when the first heat transfer element and the second heat transfer element are mated.

18 Claims, 7 Drawing Sheets

THERMAL CONNECTOR FOR JOINING MOBILE ELECTRONIC DEVICES TO DOCKING STATIONS

BACKGROUND

1. Field of the Disclosure

The present disclosure pertains to the field of heat removal from electronic components. More particularly, this disclosure relates to heat removal from a computing device which mates with another device such as a docking station.

2. Description of Related Art

Faster and more powerful computer components allow the design and construction of higher performance portable computing devices such as laptop or notebook computers. Unfortunately, the use of such faster and more powerful computer components often results in increased heat generation by such computing devices. Thus, improved heat dissipation technology is often needed to maintain operating temperatures of portable computing devices within the same range as their predecessors or some other acceptable range.

Maintaining operating temperatures of computer system components below certain levels is important to ensure performance, reliability, and safety. Most integrated circuits have specified maximum operating temperatures, above which the manufacturer does not recommend operation. Additionally, most integrated circuits have timing specifications that specify a window of time in which input signals need to be received for proper functioning as well as a window of time in which output signals are generated under normal operating conditions. Transistors, the building blocks of integrated circuits, tend to slow down as operating temperature increases. Thus, a computer system that operates its integrated circuits close to or beyond recommended timing specifications may fail as temperature increases.

Additionally, integrated circuits may be physically damaged if temperatures elevate beyond those recommended. Such physical damage obviously can impact system reliability. Finally, the computer system casing should be kept at a temperature which is safe for human contact. This may necessitate spreading of heat throughout a computer system base or efficiently expelling heat to avoid hot spots near certain components such as a processor.

Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

A docking station is a well known computing device that mates with a portable computing device to allow the portable computing device access to various resources available to the docking station. Many portable devices such as personal digital assistants and/or organizers and communication devices may utilize such a docking station arrangement. Additionally, many portable computers (i.e., laptops or notebook computers) can operate in a docking station arrangement. Alternatively, a docking station may be any device that mates with, receives, or holds a portable computing or other electronic device.

In the case of portable computers, the base of the portable computer typically connects to the docking station to allow use of a larger monitor and a full size keyboard among other things. This advantageously allows a portable computer user to operate a portable computing device in a more ergonomic desktop computer setting rather than using the small keyboard and screen often provided in a portable computing device.

Mating a portable computing device with a docking station often compounds the difficulty of cooling portable computing devices because the display is typically closed. This reduces the natural or passive cooling capability of the portable computing device because convective airflow over the top of the base is mostly blocked by the screen. Additionally, portable computers are now being designed to operate in a higher power mode when docked at the docking station, resulting in the generation of more heat to dissipate.

The prior art does not sufficiently take advantage of docking stations to dissipate heat. Particularly, the prior art does not provide an economical heat exchanger which transfers heat from a portable computing device to a docking station for dissipation via connectors which are designed to withstand repeated insertion and removal cycles and still provide low thermal resistance between the portable computing device and the docking station.

SUMMARY

A heat exchanger is disclosed. A first heat transfer element has an end which forms an engaging surface. A second heat transfer element has an integrally formed receptacle portion which has an engaging surface that is urged against the engaging surface of the first heat transfer element when the first heat transfer element and the second heat transfer element are mated.

BRIEF DESCRIPTION OF THE FIGURES

The present invention is illustrated by way of example and not limitation in the figures of the accompanying drawings.

FIG. 5b illustrates a cross sectional view of the rectangular heat exchanger shown in FIG. 5a.

DETAILED DESCRIPTION

The following description provides a thermal connector for joining mobile electronic devices to docking stations. In the following description, numerous specific details such as particular shapes, forms, and materials are set forth in order to provide a more thorough understanding of certain embodiments of the present invention. It will be appreciated, however, by one skilled in the art that the invention may be practiced without such specific details.

The present disclosure provides several solutions to remove heat from a portable computing device through a mated docking station. Some embodiments provide a durable connection which maintains a low thermal resistance despite repeated insertion and removal cycles. With the ability to remove additional heat through the docking station, it may be possible to operate components such as a processor in a portable computing device at a higher power level. As a result, a portable computing device may be able to obtain higher performance while docked at a docking station.

Figure 1:
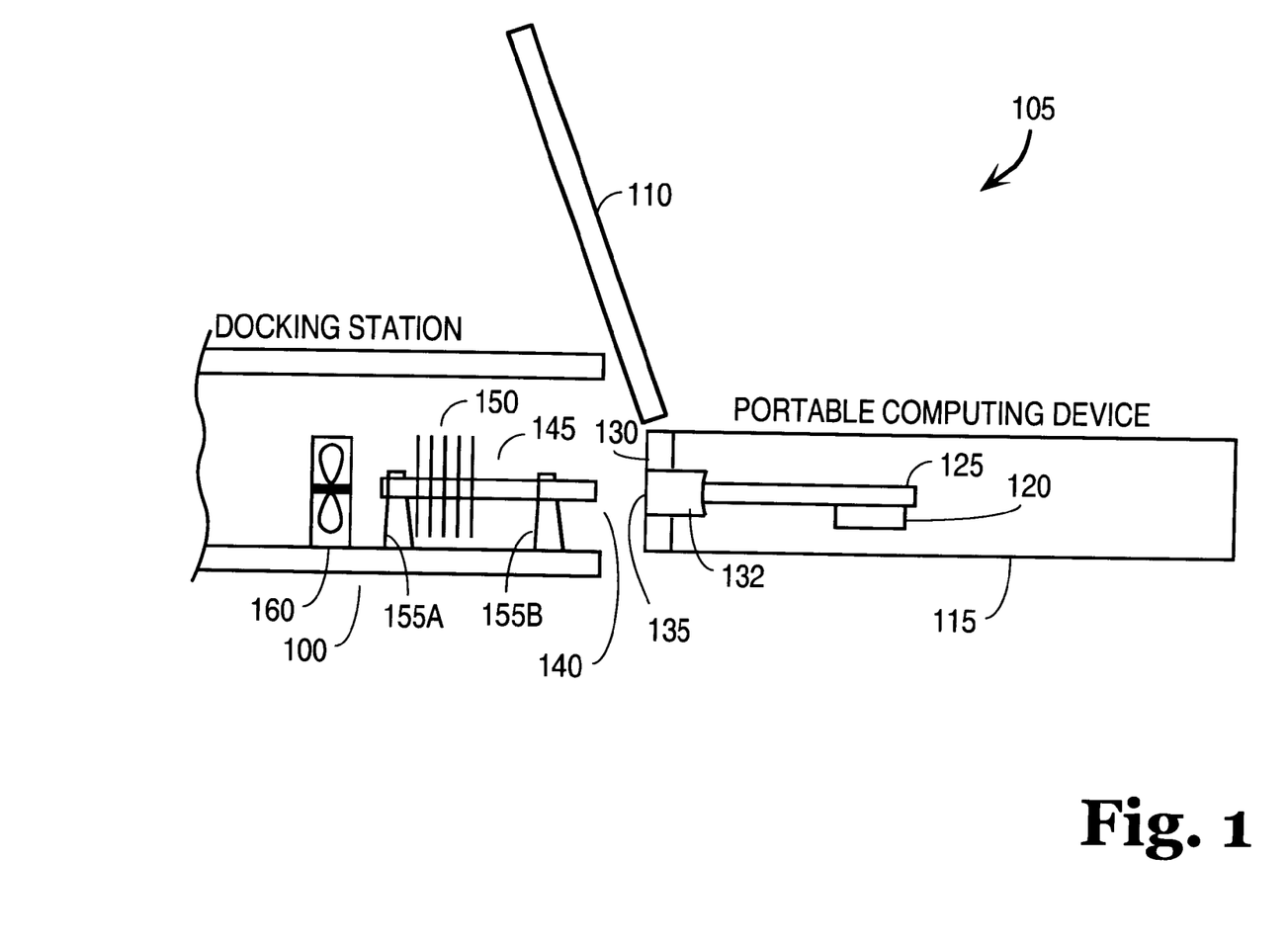
FIG. 1 illustrates a side cross sectional view of one embodiment of a portable computing device and a docking station.

FIG. 1 illustrates one embodiment of a portable computing device 105 which mates with a docking station. The portable computing device 105 may be a laptop computer, a notebook computer, or any other portable computing device which may utilize additional cooling capacity when docked at a docking station 100. The portable computing device 105 includes at least an electronic component 120 and a heat transfer element 125 to convey heat away from the electronic component. Additionally, the portable computing device includes a base 115 and a display 110 mounted using a hinge mechanism (not shown) at one edge of the base 115.

In one embodiment, the electronic component 120 is a processor; however, other components or regions of the portable computing device may be cooled according to the techniques disclosed herein. In a typical laptop or notebook computer, a memory system, a disk and/or CD ROM drive, audio and video hardware, connectivity (i.e., network and modem) hardware, as well as a power supply may all be present. These or other individual components as well as circuit boards or regional heat sinks within the portable computing device 105 may be cooled according to the present invention.

Figure 2A:
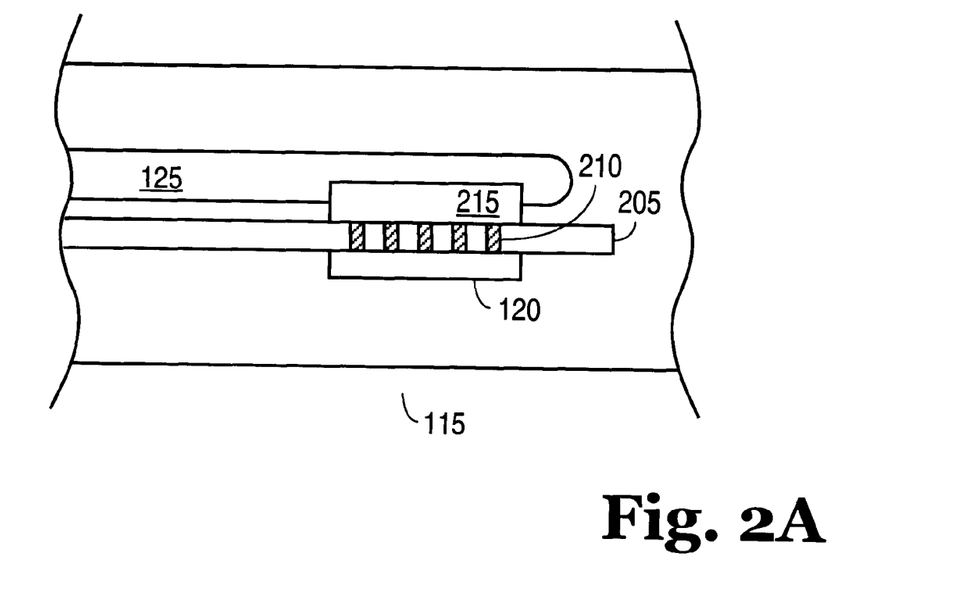
FIG. 2a illustrates a partial cross section view of one embodiment of the connection of a heat transfer element to an electronic component.
Figure 2B:
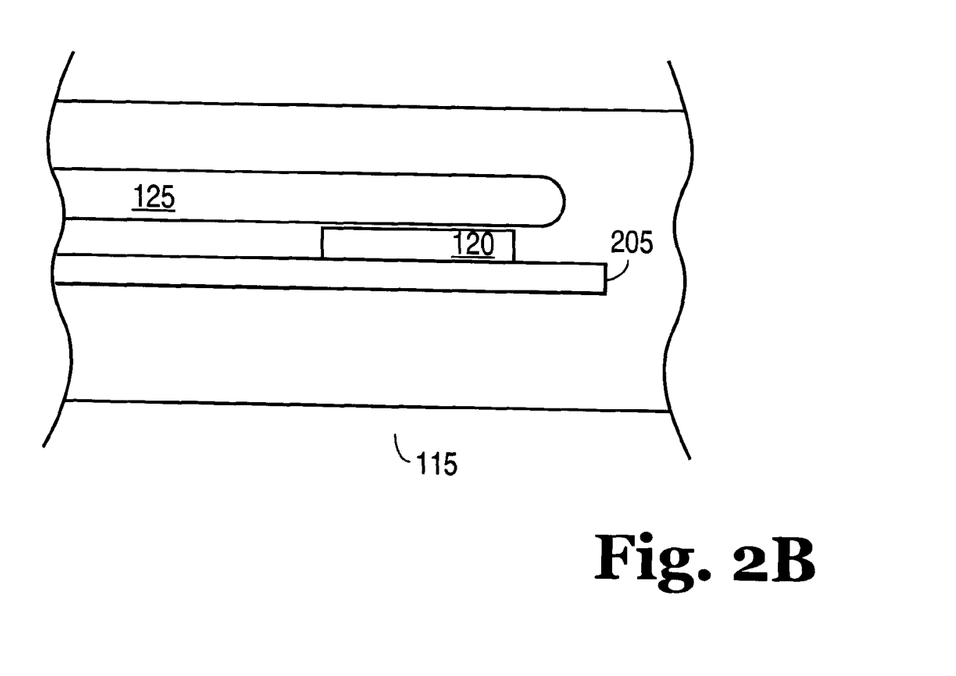
FIG. 2b illustrates a partial cross section view of another embodiment of the connection of a heat transfer element to an electronic component.

One end of the heat transfer element 125 is thermally coupled to the electronic component 120. FIGS. 2a and 2b illustrate embodiments of the thermal coupling of the electronic component 120 to the heat transfer element 125. In FIG. 2a, the electronic component 120 is mounted on one side of a motherboard 205 and thermally coupled to the heat transfer element 125 by several heat conducting components.

The heat conducting components of FIG. 2a include motherboard vias 210 and a heat conducting block 215. The block 215 may be an aluminum block and the vias 210 may be filled with solder. The heat transfer element 125 is affixed to the heat conducting block 215 using solder, thermal epoxy, or other suitable means as are known or otherwise available in the art. This type of mounting may be preferable if the electronic component does not have a rigid package which can withstand a direct connection with the heat transfer element 125.

FIG. 2b illustrates an embodiment in which the heat transfer element 125 is directly mounted on an outer surface of the electronic component 120 using a thermal epoxy, solder, or similar mounting mechanisms. The inner surface of the component is affixed to the motherboard 205. Either of these types of connections may be used as well as any other means of thermally coupling the electronic component 120 and the heat transfer element 125.

Referring back to FIG. 1, an end portion 135 of the heat transfer element 125 may be exposed through a closeable aperture at a mating end of the portable computing device 105 when the portable computing device 105 is docked. Mechanisms known in the art or otherwise available may be used to cause a door 130 to open the closeable aperture, either automatically or manually.

The docking station 100 includes a second heat transfer element 145. The second heat transfer element 145 is secured to the docking station 100 by a pair of mounting brackets 155a and 155b. Other known mounting mechanisms may be used as is convenient for a particular docking station configuration. For instance, only a single mounting bracket may be used, or more than two mounting brackets may be used. A set of heat dissipation fins 150 and a fan 160 as well as the heat transfer element 145 may be used as a heat dissipation mechanism in the docking station.

A heat exchanger is formed by the mating of heat transfer elements 125 and 145. One end portion 140 of the heat transfer element 145 is thermally coupled to the end portion 135 of the heat transfer element 125 when the docking station 100 and the portable computing device 105 mate. As illustrated, in one embodiment, the heat exchange mechanism is formed by receptacle such as a spring clip 132 attached to the heat transfer element 125 engaging a male end portion 140 of the heat transfer element 145. Alternatively, these mechanisms may be reversed so that the spring clip 132 is attached to the docking station.

In one embodiment, the heat transfer element 145 is a cylindrical or at least substantially cylindrical heat pipe. In this embodiment, the spring clip 132 is a cylindrical receptacle that engages the similarly shaped male end portion 140. The spring clip 132 is soldered or otherwise strongly thermally and mechanically bonded to a heat pipe which conveys heat from the electronic component 120. In other embodiments, one or both of the heat pipes may be rectangular or another shape as long as the spring clip 132 is also appropriately shaped to sufficiently thermally engage the end portion 140 of the heat transfer element 145 and provide a low thermal resistance path.

Figure 3:
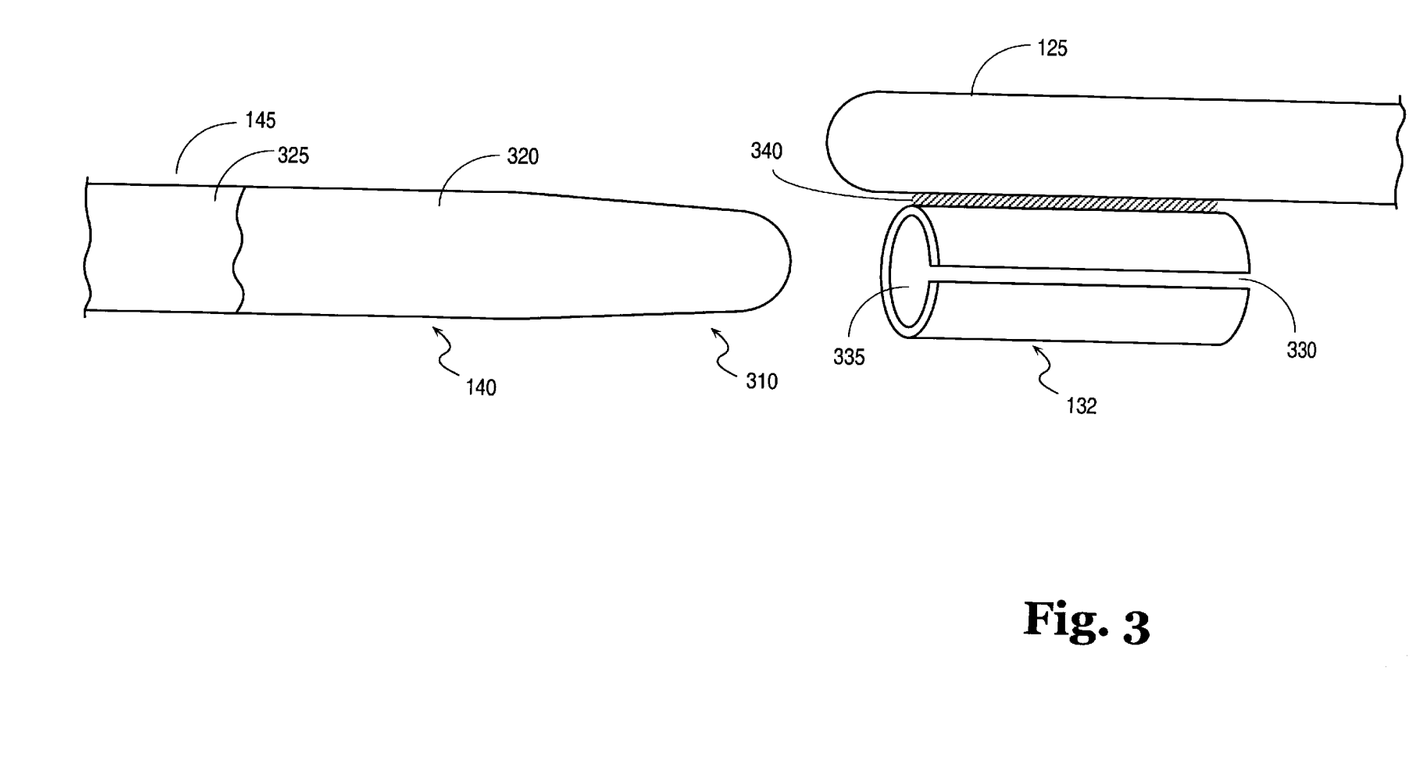
FIG. 3 illustrates a partial elevation view of one embodiment of a heat exchanger.

FIG. 3 illustrates one embodiment of the heat exchanger shown in FIG. 1. In particular, the end portion 140 of the heat transfer element 145 as well as the spring clip 132 and the heat transfer element 125 are shown. In this embodiment, the end portion 140 of the heat transfer element 145 has a tapered portion 310 to facilitate insertion into the spring clip 132.

In addition, the heat transfer element has a non-plated portion 325 and a plated portion 320, the plated portion 320 being plated with a durable and thermally conductive material. For example, gold, molybdenum, an alloy, or another durable and thermally conductive material may be used. The plated portion 320 forms an engaging surface which comes into direct contact with the spring clip 132.

In the embodiment illustrated in FIG. 3, the spring clip 132 is an integrally formed separate body (i.e., it is one piece) which is affixed to the heat transfer element 125 via a weld 340 or another suitable thermally conductive attachment mechanism. In some embodiments, the spring clip 132 may also be formed integrally with the entire heat transfer element 125. In either case, the resilient unitary body of the spring clip forms a receptacle with a single integrally formed body that urges its engaging surface into contact with the heat transfer element when appropriately mated. External springs or similar mechanisms may not be necessary. The resilient unitary body of the spring clip 132 has a slit 330 allowing the spring clip 132 to deform and accommodate the heat transfer element 125.

Typically the spring clip 132 is slightly smaller than the heat transfer element 125 and expands to conform to the heat transfer element 145. The spring clip 132 may also include a plated engaging surface 335 and the leading edge may be beveled to further ease insertion. Similarly to the end portion 140 of the heat transfer element 145, the engaging surface 335 of the spring clip 132 may be coated with any appropriate thermally conductive and durable material such as gold.

Figure 4:
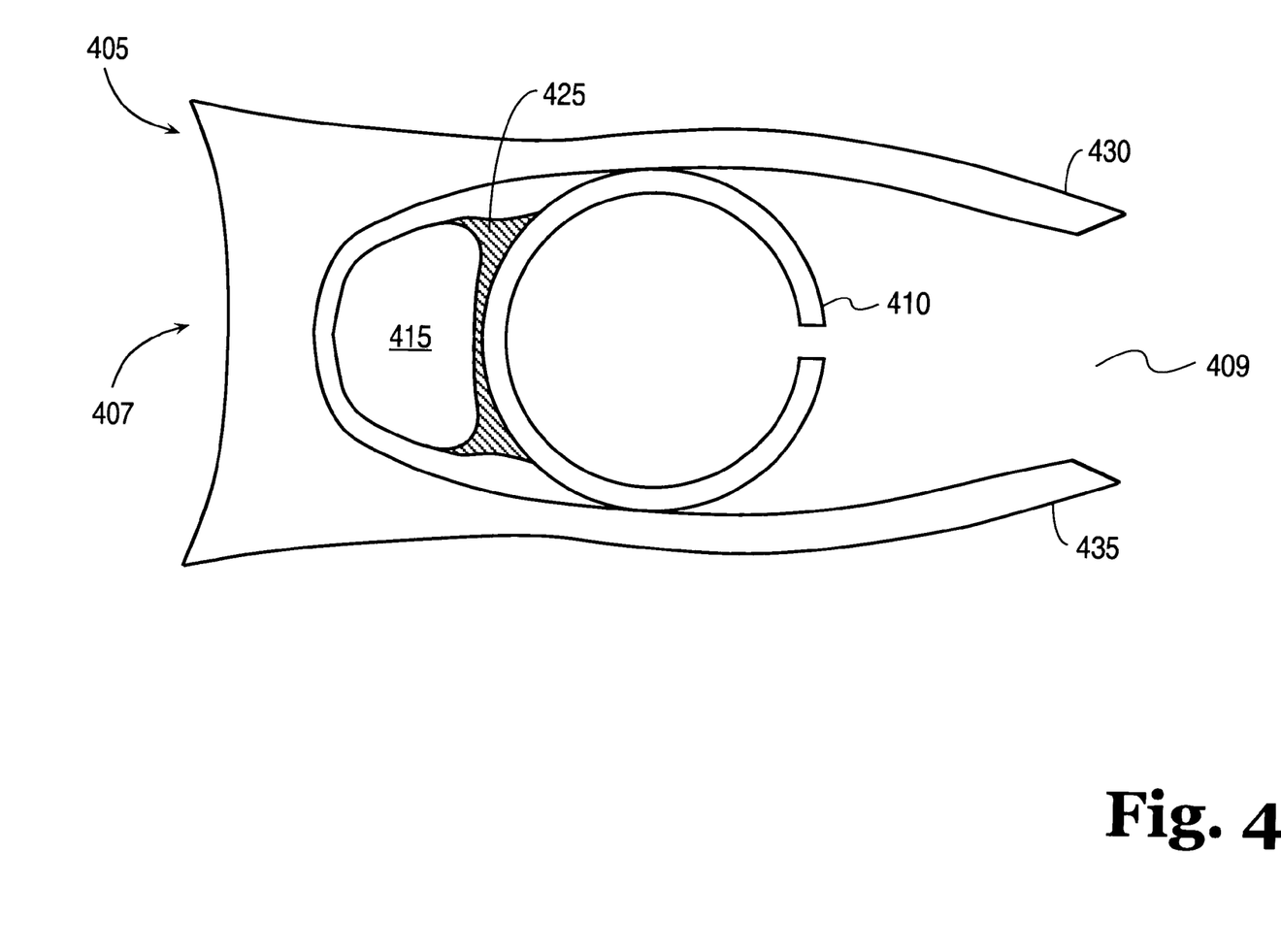
FIG. 4 illustrates a cross sectional view of one embodiment including a spring clip compression structure which may be used with the cylindrical spring clip illustrated in FIG. 3.

FIG. 4 illustrates a spring clip compression structure 405. The spring clip compression structure may provide additional compression force on a cylindrical spring clip 410, urging the spring clip 410 against a heat transfer element so that a better thermal connection may be made with the heat transfer element. The spring clip compression structure 405 may also allow a less resilient material to be used for the spring clip 410. For example, without the compression structure, a spring steel material may be needed for the cylindrical spring clip 410 to form an adequate contact with an inserted heat transfer element. With the compression structure, a less resilient material which may have better thermal properties (e.g., copper) may be used.

The spring clip compression structure 405 has a closed end 407 and an open end 409. The closed end 407 has two elongated spring members 430 and 435 which extend from the closed end and which hold the spring clip 410 so that a compressing force is exerted on the spring clip 410. A weld 425 or another appropriate thermally conductive bond affixes a heat pipe 415 or other heat transfer element to the spring clip 410. Other mechanical forms which provide compressive force and/or which secure the heat pipe 415 and spring clip 410 may be used to provide a spring clip compression stricture.

Figure 5A:
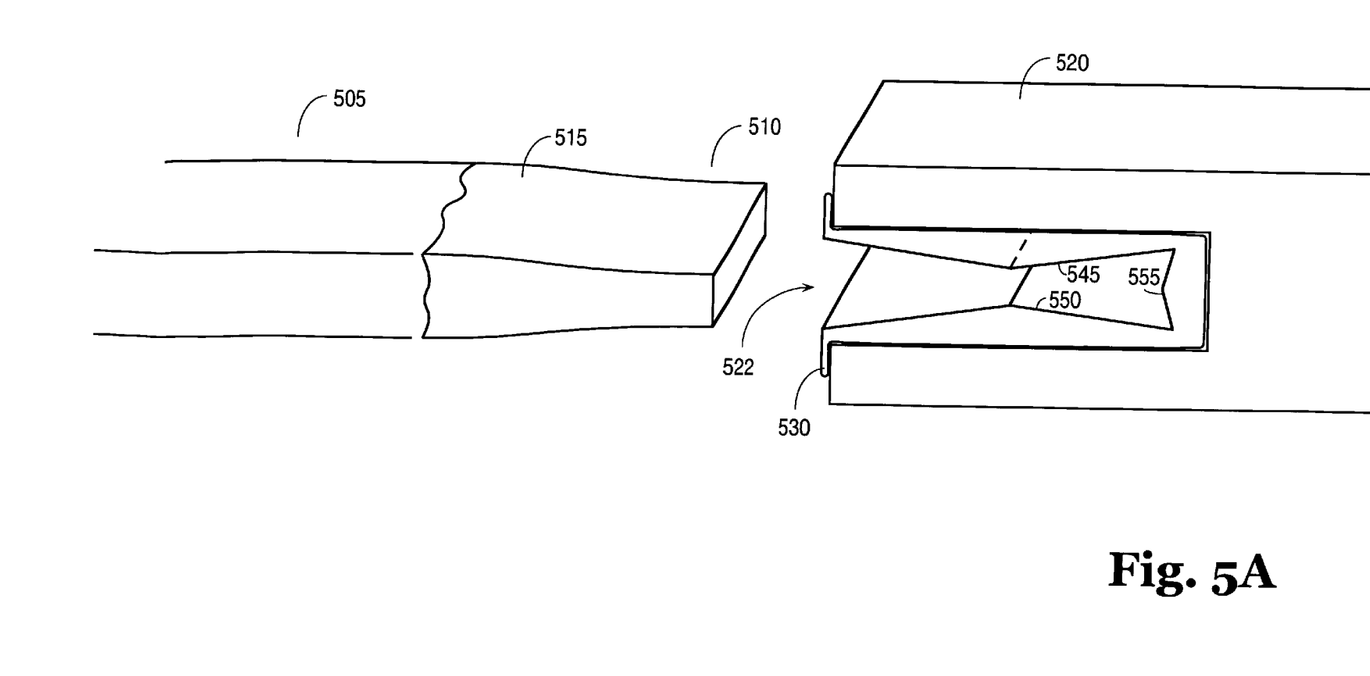
FIG. 5a illustrates an elevation view of one embodiment of a rectangular heat exchanger.

FIG. 5a illustrates one embodiment of a rectangular heat exchange apparatus. In FIG. 5a, a rectangular heat pipe 505 with a tapered end 510 having a durable plating 515 is engaged by a spring clip 522 secured in an open end of a heat pipe 520. The spring clip 522 has a housing 530 which secures the spring clip 522 in the rectangular aperture formed by the open end of the heat pipe 520. Additionally, substantially parallel and resilient plates form compressible engaging surfaces 545 and 550 which respectively provide top and bottom surfaces that mate with the heat pipe 505 to provide a thermal connection. A rear surface 555 may also be resilient and compressible to accommodate the heat pipe 505.

As shown, the spring clip 522 has a housing 530. This housing 530 may be secured in the aperture of the heat pipe 520 by forcible insertion. The housing 530 and therefore the spring clip 522 may be designed to be equal in size or marginally larger than the aperture such that the housing 530 remains in place once inserted. Either in addition or as a separate securing mechanism, nubs or other mechanical or bonding means may be used to hold the housing 530 in place.

Alternatively, the spring clip 522 itself may be formed as a part of the heat pipe 520 or as an integral part of another type of heat transfer element substituted for the heat pipe 520. The spring clip 522 itself, like the cylindrical spring clip previously discussed, however, may be uncomplicated and easily manufactured integral body which provides an efficient durable mechanism for thermal transfer. Such spring clip mechanisms have few moving parts and may advantageously be manufactured and deployed in computer systems similarly to existing electrical connectors often used between removable electronic components.

Figure 5B:
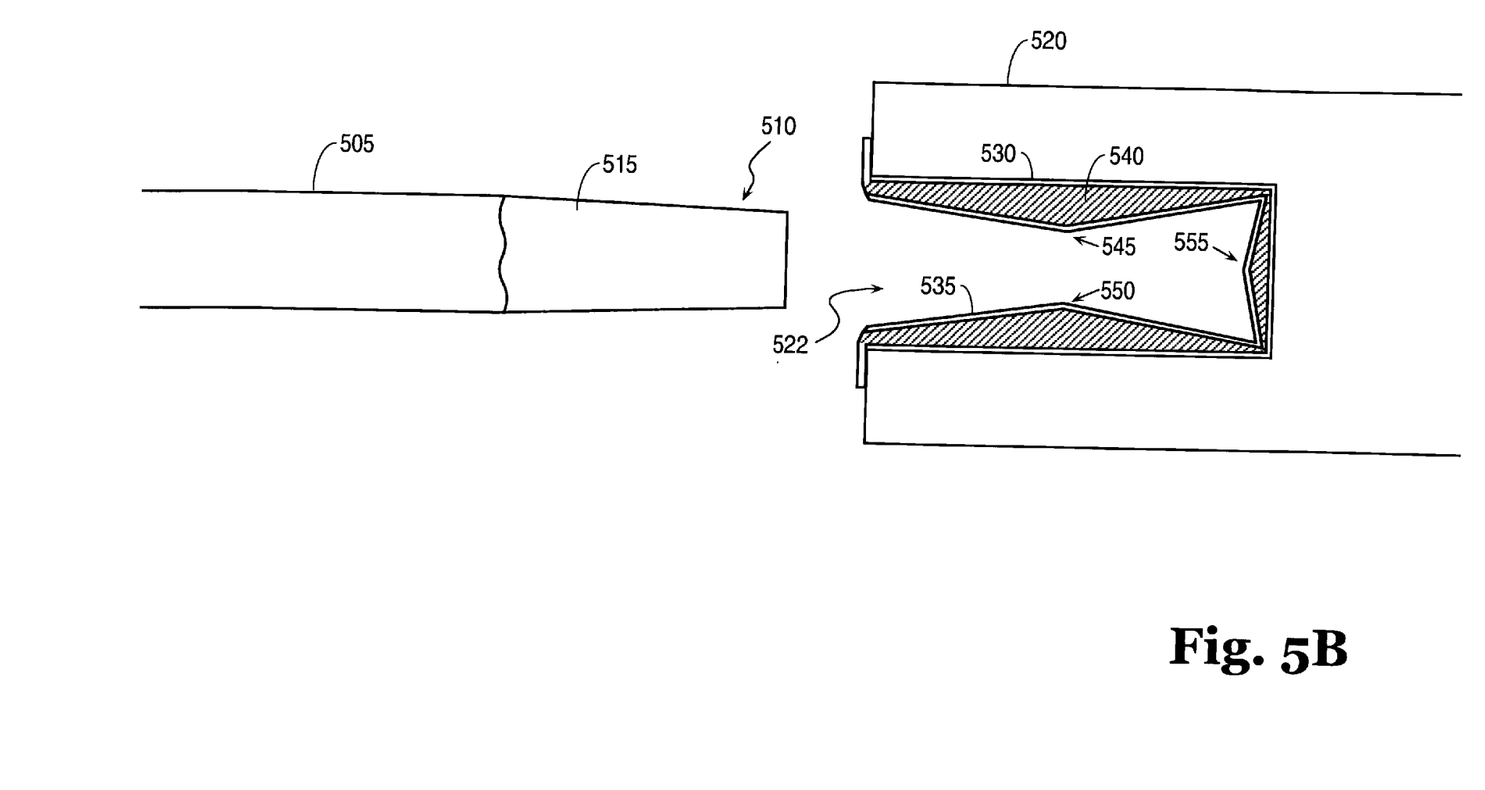

FIG. 5b is a cross sectional view of the receptacle structure in FIG. 5a which illustrates several additional features which may be present in some embodiments. A plating 535 provides a durable high thermal conductivity interface for the heat pipe 505 like the plated surfaces previously discussed. Additionally, the housing 530 of the spring clip 522 contains a thermally conductive and compressible material 540. For example, this material may be a thermal grease, a thermally conductive polymer, a thermally conductive compressible elastomer or another thermally conductive, flexible, or yielding material.

Figure 6:
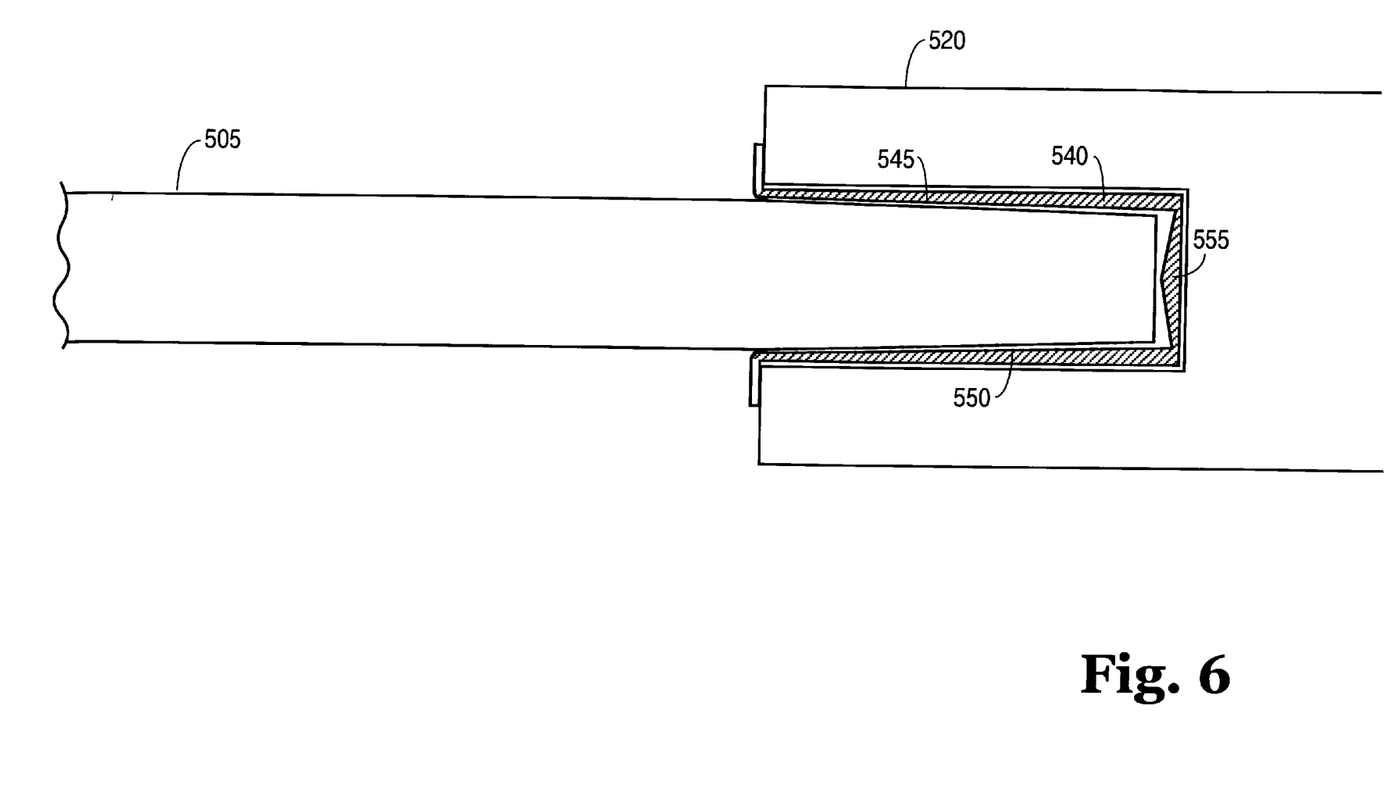
FIG. 6 illustrates a cross sectional view of the rectangular heat exchanger of FIGS. 5a and 5b in a mated position.

FIG. 6 illustrates the compression which occurs to the spring clip 522 shown in FIGS. 5a and 5b when the heat pipe 505 is inserted. As can be appreciated from FIG. 6, although the heat pipe 505 may be taller than the opening formed by the compressible engaging surfaces 545 and 550 in their relaxed state, these surfaces compress to snugly fit the heat pipe 505 and form a strong thermal connection. The thermally conductive and compressible material 540 maintains a low thermal resistance from the engaging surfaces 545 and 550 to the heat pipe 520 despite the change in shape of the spring clip engaging surfaces.

Thus, a thermal connector for joining mobile electronic devices to docking stations is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A heat exchanger comprising:
  a first heat transfer element having a first end which forms a first engaging surface; and
  a second heat transfer element having a receptacle portion that is a cylindrical spring clip having a slit to allow expansion thereof, the receptacle portion being integrally formed and having a receptacle engaging surface urged against the first engaging surface of the first heat transfer element when the first heat transfer element and the second heat transfer element are mated by at least partial insertion of said engaging surface of said first heat transfer element into said receptacle portion of said second heat transfer element.

2. The heat exchanger of claim 1 wherein the first heat transfer element and the second heat transfer element are heat pipes.

3. The heat exchanger of claim 1 wherein the spring clip portion has a resilient unitary body which is deformed by insertion of the first heat transfer element.

4. The heat exchanger of claim 1 wherein the spring clip portion is formed using spring steel and is welded to the first heat transfer element.

5. The heat exchanger of claim 1 wherein the spring clip portion has a beveled edge which receives the first heat transfer element and wherein the first engaging surface and the spring clip engaging surface are plated with a durable and thermally conductive material.

6. The heat exchanger of claim 5 wherein the durable and thermally conductive metal is gold.

7. The heat exchanger of claim 1 further comprising:
  a spring clip compression structure attached to the spring clip portion which urges the spring clip portion against the first heat transfer element when the first heat transfer element and the second heat transfer element are mated.

8. The heat exchanger of claim 7 wherein the spring clip portion is a cylindrical spring clip which is attached to a heat pipe and wherein the spring clip compression structure has a closed end and an open end, the closed end having two elongated spring members extending outwardly to form the open end, the spring clip portion being compressively held between the two elongated spring members.

9. A heat exchanger comprising:
a first heat transfer element having a first end which forms a first engaging surface;
a second heat transfer element having a receptacle portion comprising a spring clip portion, wherein the spring clip portion comprises a rectangular contact having resilient and substantially parallel plates that are compressible for contacting the first heat transfer element.

10. The heat exchanger of claim 9 wherein the second heat transfer element comprises a heat pipe having a rectangular aperture which houses the spring clip portion.

11. The heat exchanger of claim 10 wherein the spring clip portion further comprises a spring clip housing which is mounted in the rectangular aperture of the heat pipe and which secures the parallel plates, and further wherein a thermally conductive material fills a gap formed between the parallel plates and the spring clip housing.

12. The heat exchanger of claim 11 wherein the first heat transfer element is plated with a durable and thermally conductive material and wherein the first heat transfer element is tapered towards the first end.

13. The heat exchanger of claim 12 wherein the durable and thermally conductive material is gold.

14. A computing device arrangement comprising:
a portable computing device having an electronic component therein;
a docking station which receives the portable computing device and has a heat dissipation element therein; and
a heat exchanger thermally coupling the electronic component in the portable computing device to the heat dissipation element in the docking station, the heat exchanger including:
a first heat transfer element having a first end which forms a first engaging surface; and
a second heat transfer element having a receptacle comprising a cylindrical spring clip having a slit to allow expansion thereof, the receptacle being integrally formed and having a receptacle engaging surface urged against the first engaging surface of the first heat transfer element when the first heat transfer element and the second heat transfer element are mated by at least partial insertion of said engaging surface of said first heat transfer element into said receptacle portion of said second heat transfer element.

15. The computing device arrangement of claim 14 wherein the spring clip portion comprises a rectangular contact having resilient and substantially parallel plates for contacting the first heat transfer element.

16. A computing device arrangement comprising:
a portable computing device having an electronic component therein;
a docking station which receives the portable computing device and has a heat dissipation element therein; and
a heat exchanger thermally coupling the electronic component in the portable computing device to the heat dissipation element in the docking station, the heat exchanger including:
a first heat transfer element having a first end which forms a first engaging surface; and
a second heat transfer element having a receptacle comprising a spring clip portion, wherein the spring clip portion further comprises a spring clip housing which is mounted in a rectangular aperture of the heat pipe and which secures compressible substantially parallel plates, and further wherein a thermally conductive and compressible material fills a gap formed between the parallel plates and the spring clip housing.

17. An apparatus comprising:
a mobile computing device having at least one electronic component therein;
a device including a heat dissipation means for dissipating heat, the device having a receptacle which mates with the mobile computing device; and
heat transfer means for thermally coupling the at least one electronic component in the mobile computing device to the heat dissipation means in the stationary computing device, the heat transfer means comprising:
a first heat transfer element coupled to the at least one electronic component;
a second heat transfer element coupled to the heat dissipation means; and
a spring clip means for removably coupling the first heat transfer element to the second heat transfer element, the spring clip means being fixedly mounted to provide a receptacle which is smaller than a first end of the first heat transfer element prior to insertion into a receptacle at the first end of the first heat transfer element, the spring clip means being expandable to conform to the first end of the first heat transfer element.

18. A heat exchanger comprising:
a first heat transfer element having a first end which forms a first engaging surface;
a second heat transfer element having a receptacle portion comprising a spring clip portion, wherein the spring clip portion is fixedly mounted to the second heat transfer element to provide a receptacle which is smaller than the first end of the first heat transfer element prior to insertion into the receptacle of the first end of the first heat transfer element, the spring clip being compressible to conform to the first end of the first heat transfer element.

* * * * *

UNITED STATES PATENT AND TRADEMARK OFFICE
CERTIFICATE OF CORRECTION

PATENT NO. : 6,313,987 B1
DATED : November 6, 2001
INVENTOR(S) : O'Connor et al.

Page 1 of 1

It is certified that error appears in the above-identified patent and that said Letters Patent is hereby corrected as shown below:

<u>Column 5,</u>
Line 32, delete "stricture" and insert -- structure --.

Signed and Sealed this

Twenty-first Day of May, 2002

Attest:

Attesting Officer

JAMES E. ROGAN
Director of the United States Patent and Trademark Office